United States Patent
Koteshwar Srinath et al.

(10) Patent No.: US 11,736,899 B2
(45) Date of Patent: Aug. 22, 2023

(54) TRAINING IN COMMUNICATION SYSTEMS

(71) Applicant: Nokia Technologies Oy, Espoo (FI)

(72) Inventors: Pavan Koteshwar Srinath, Orsay (FR); Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 142 days.

(21) Appl. No.: 17/145,955

(22) Filed: Jan. 11, 2021

(65) Prior Publication Data
US 2021/0219099 A1  Jul. 15, 2021

(30) Foreign Application Priority Data

Jan. 14, 2020  (FI) .................................... 20205030

(51) Int. Cl.
*H04W 4/029*  (2018.01)
*G01S 5/02*  (2010.01)

(52) U.S. Cl.
CPC .......... *H04W 4/029* (2018.02); *G01S 5/0246* (2020.05)

(58) Field of Classification Search
CPC ..... H04W 4/029; H04W 64/00; G01S 5/0246; G01S 5/252; G06N 3/088; G06N 20/00; G05B 13/04
See application file for complete search history.

(56) References Cited

U.S. PATENT DOCUMENTS

| | | | |
|---|---|---|---|
| 6,397,073 B1 | 5/2002 | Hottinen | |
| 2009/0109095 A1 | 4/2009 | Hido et al. | |

(Continued)

FOREIGN PATENT DOCUMENTS

WO  2018/094502 A1  5/2018

OTHER PUBLICATIONS

Extended European Search Report received for corresponding European Patent Application No. 21151065.6, dated Jun. 14, 2021, 7 pages.

(Continued)

*Primary Examiner* — Umair Ahsan
(74) *Attorney, Agent, or Firm* — Squire Patton Boggs (US) LLP

(57) ABSTRACT

An apparatus, method and computer program is described comprising: generating a first loss function component comprising comparing first location data with first location estimates, wherein the first location estimates are based on channel state data, wherein the first location estimates are generated using a model, and wherein the model comprises a plurality of trainable parameters; generating a second loss function component comprising comparing the first location data with second location estimates, wherein the second location estimates are based on channel state data that have been subjected to a first augmentation and wherein the second location estimates are generated using the model; generating a third loss function component comprising comparing third location estimates based on channel state data and fourth location estimates based on channel state data that have been subjected to a second augmentation, wherein the third and fourth location estimates are generated using the model; and training the trainable parameters of the model by minimising a loss function based on a combination of the first, second and third loss function components.

19 Claims, 9 Drawing Sheets

(56) References Cited

U.S. PATENT DOCUMENTS

| | | | |
|---|---|---|---|
| 2019/0253861 | A1 | 8/2019 | Horelik et al. |
| 2019/0259041 | A1 | 8/2019 | Jackson |
| 2019/0362237 | A1* | 11/2019 | Choi .................. G01S 5/14 |
| 2021/0319286 | A1* | 10/2021 | Gunduz ............. G06N 3/0454 |
| 2021/0352441 | A1* | 11/2021 | Liu .................... H04B 17/318 |

OTHER PUBLICATIONS

Lei et al., "Siamese Neural Networks for Wireless Positioning and Channel Charting", 57th Annual Allerton Conference on Communication, Control, and Computing (Allerton), Sep. 24-27, 2019, pp. 200-207.

Yoo et al., "Distributed Estimation using Online Semi-supervised Particle Filter for Mobile Sensor Networks", IET Control Theory and Applications, vol. 9, No. 3, Feb. 2015, pp. 418-427.

Bai et al., "DL-RNN: An Accurate Indoor Localization Method via Double RNNs", IEEE Sensors Journal, vol. 20, No. 1, Jan. 1, 2020, pp. 286-295.

"Wireless E911 Location Accuracy Requirements", Federal Communications Commission, Fourth Report and Order, FCC No. 15-9, PS Docket No. 07-114, DA 15-433, Apr. 2015, pp. 1-7.

Peral-Rosado et al., "Survey of Cellular Mobile Radio Localization Methods: From 1G to 5G", IEEE Communications Surveys & Tutorials, vol. 20, No. 2, Second Quarter 2018, pp. 1124-1148.

Studer et al., "Channel Charting: Locating Users Within the Radio Environment Using Channel State Information", IEEE Access, vol. 6, Aug. 2018, pp. 47682-47698.

Widmaier et al., "Towards Practical Indoor Positioning Based on Massive MIMO Systems", arXiv, May 28, 2019, 6 pages.

Office action received for corresponding Finnish Patent Application No. 20205030, dated Apr. 24, 2020, 8 pages.

Sinha et al., "Data Augmentation Schemes for Deep Learning in an Indoor Positioning Application", Electronics, vol. 8, No. 5, May 2019, pp. 1-19.

Office action received for corresponding Finnish Patent Application No. 20205030, dated Dec. 7, 2020, 7 pages.

\* cited by examiner

TRAINING IN COMMUNICATION SYSTEMS

FIELD

The present specification relates to training in communication systems.

BACKGROUND

For many reasons, it may be desired to know the position of a device, such as a user device, in space (e.g. an absolute position or a position relative to a communication node, such as a base station). There remains a need for further developments in this field.

SUMMARY

In a first aspect, this specification describes an apparatus comprising means for performing: generating a first loss function component comprising comparing first location data (e.g. measured location data of a user device) with first location estimates (e.g. location estimates of the user device), wherein the first location estimates are based on channel state data, wherein the first location estimates are generated using a model, and wherein the model comprises a plurality of trainable parameters; generating a second loss function component comprising comparing the first location data with second location estimates, wherein the second location estimates are based on channel state data that have been subjected to a first augmentation and wherein the second location estimates are generated using the model; generating a third loss function component comprising comparing third location estimates based on channel state data and fourth location estimates based on channel state data that have been subjected to a second augmentation, wherein the third and fourth location estimates are generated using the model; and training the trainable parameters of the model by minimising a loss function based on a combination of the first, second and third loss function components. The said combination may comprise a sum (e.g. a weighted sum) of the first, second and third loss function components. The model may be configured to estimate a position of a user device based on channel state information for communications between the user device and a communication node.

In some example embodiments, the means are further configured to perform: generating the loss function by combining the first, second and third loss function components.

In some example embodiments, the means are further configured to perform: receiving, retrieving or otherwise obtaining a first data set, wherein the first data set comprises labelled data including channel state information and associated location data, wherein said first location data is derived from said associated location data (for example, the said location data may be the location data). The means may be further configured to perform: generating the first location estimates based on at least some of the channel state data of the first data set; and generating the second location estimates based on at least some of the channel state data of the first data set that have been subjected to said first augmentation.

In some example embodiments, the means are further configured to perform: receiving, retrieving or otherwise obtaining a second data set, wherein the second data set comprises unlabelled data including channel state information. The means may be further configured to perform: generating the third location estimates based on at least some of the channel state data of the second data set; and generating the fourth location estimates based on at least some of the channel state data of the second data set that have been subjected to said second augmentation.

In some example embodiments, each augmentation comprises one or more of: a phase rotation; an amplitude magnification; an amplitude reduction; an addition of Gaussian noise; a filtering or smoothing; a neural-network based augmentation; or an element replacement algorithm.

Each augmentation may provide a random or a pseudo-random transformation of the relevant channel state information.

In some example embodiments, the means are further configured to perform: generating a plurality of said second loss function components by comparing the first location data with multiple second location estimates based on channel state data subjected to different instances of the first augmentation; and/or generating a plurality of said third loss function components by comparing the third location estimates with multiple fourth location estimates based on channel state data that have been subjected to different instances of the second augmentation.

The model may be a machine-learning model.

The model may be implemented using a neural network.

The means may comprise: at least one processor; and at least one memory including computer program code, the at least one memory and the computer program configured, with the at least one processor, to cause the performance of the apparatus.

In a second aspect, this specification describes a method comprising: generating a first loss function component comprising comparing first location data with first location estimates, wherein the first location estimates are based on channel state data, wherein the first location estimates are generated using a model, and wherein the model comprises a plurality of trainable parameters; generating a second loss function component comprising comparing the first location data with second location estimates, wherein the second location estimates are based on channel state data that have been subjected to a first augmentation and wherein the second location estimates are generated using the model; generating a third loss function component comprising comparing third location estimates based on channel state data and fourth location estimates based on channel state data that have been subjected to a second augmentation, wherein the third and fourth location estimates are generated using the model; and training the trainable parameters of the model by minimising a loss function based on a combination of the first, second and third loss function components. The said combination may comprise a sum (e.g. a weighted sum) of the first, second and third loss function components. The model may be configured to estimate a position of a user device based on channel state information for communications between the user device and a communication node.

The loss function may be generated by combining the first, second and third loss function components.

The method may comprise: receiving, retrieving or otherwise obtaining a first data set, wherein the first data set comprises labelled data including channel state information and associated location data, wherein said first location data is derived from said associated location data. The method may comprise: retrieving or otherwise obtaining a second data set, wherein the second data set comprises unlabelled data including channel state information.

The method may comprise: generating a plurality of said second loss function components by comparing the location data with multiple second location estimates based on channel state data subjected to different instances of the first augmentation; and/or generating a plurality of said third loss function components by comparing the third location estimates with multiple fourth location estimates based on channel state data that have been subjected to different instances of the second augmentation.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: generating a first loss function component comprising comparing first location data with first location estimates, wherein the first location estimates are based on channel state data, wherein the first location estimates are generated using a model, and wherein the model comprises a plurality of trainable parameters; generating a second loss function component comprising comparing the first location data with second location estimates, wherein the second location estimates are based on channel state data that have been subjected to a first augmentation and wherein the second location estimates are generated using the model; generating a third loss function component comprising comparing third location estimates based on channel state data and fourth location estimates based on channel state data that have been subjected to a second augmentation, wherein the third and fourth location estimates are generated using the model; and training the trainable parameters of the model by minimising a loss function based on a combination of the first, second and third loss function components.

In a sixth aspect, this specification describes a computer-readable medium (such as a non-transitory computer-readable medium) comprising program instructions stored thereon for performing at least the following: generating a first loss function component comprising comparing first location data with first location estimates, wherein the first location estimates are based on channel state data, wherein the first location estimates are generated using a model, and wherein the model comprises a plurality of trainable parameters; generating a second loss function component comprising comparing the first location data with second location estimates, wherein the second location estimates are based on channel state data that have been subjected to a first augmentation and wherein the second location estimates are generated using the model; generating a third loss function component comprising comparing third location estimates based on channel state data and fourth location estimates based on channel state data that have been subjected to a second augmentation, wherein the third and fourth location estimates are generated using the model; and training the trainable parameters of the model by minimising a loss function based on a combination of the first, second and third loss function components.

In a seventh aspect, this specification describes an apparatus comprising: at least one processor; and at least one memory including computer program code which, when executed by the at least one processor, causes the apparatus to: generate a first loss function component comprising comparing first location data with first location estimates, wherein the first location estimates are based on channel state data, wherein the first location estimates are generated using a model, and wherein the model comprises a plurality of trainable parameters; generate a second loss function component comprising comparing the first location data with second location estimates, wherein the second location estimates are based on channel state data that have been subjected to a first augmentation and wherein the second location estimates are generated using the model; generate a third loss function component comprising comparing third location estimates based on channel state data and fourth location estimates based on channel state data that have been subjected to a second augmentation, wherein the third and fourth location estimates are generated using the model; and train the trainable parameters of the model by minimising a loss function based on a combination of the first, second and third loss function components.

In an eighth aspect, this specification describes an apparatus comprising: a first loss function module for generating a first loss function component by comparing first location data with first location estimates, wherein the first location estimates are based on channel state data, wherein the first location estimates are generated using a model, and wherein the model comprises a plurality of trainable parameters; a second loss function module for generating a second loss function component by comparing the first location data with second location estimates, wherein the second location estimates are based on channel state data that have been subjected to a first augmentation and wherein the second location estimates are generated using the model; a third loss function module for generate a third loss function component by comparing third location estimates based on channel state data and fourth location estimates based on channel state data that have been subjected to a second augmentation, wherein the third and fourth location estimates are generated using the model; and a training module for training the trainable parameters of the model by minimising a loss function based on a combination (e.g. a sum, such as a weighted sum) of the first, second and third loss function components.

BRIEF DESCRIPTION OF THE DRAWINGS

Example embodiments will now be described, by way of non-limiting examples, with reference to the following schematic drawings, in which.

DETAILED DESCRIPTION

Figure 1:
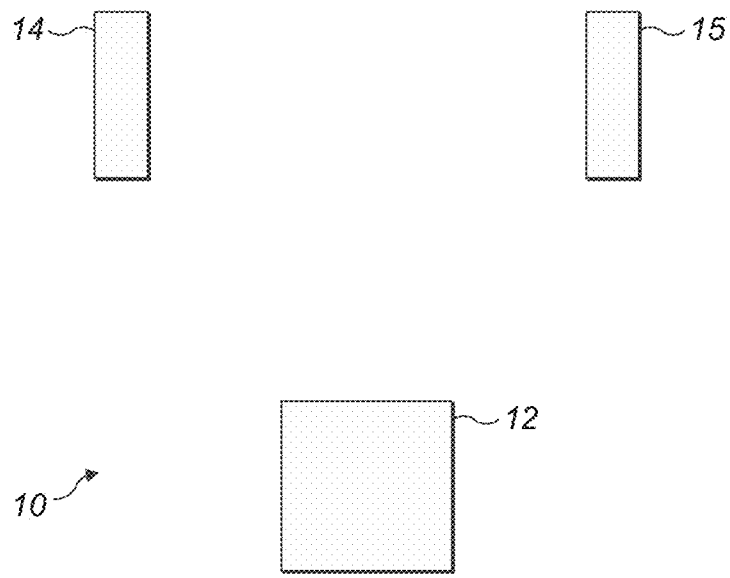
FIGS. 1 to 4 are block diagrams of systems in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 includes a base station 12, a first user device 14 and a second user device 15. For many reasons, it may be desired to know the position of the first user device 14 and/or the second user device 15, either in absolute terms or relative to the position of the base station 12. It should be noted that although the embodiments described herein generally relate to user devices and base stations, the principles can be applied to any devices in communication with any suitable communication node.

Figure 2:
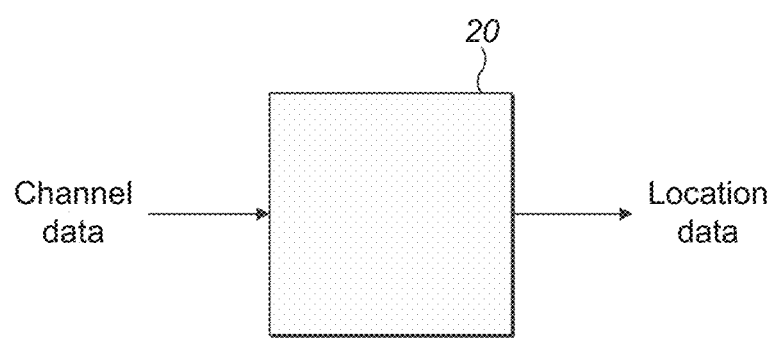

FIG. 2 is a block diagram of a system 20 for providing an estimate of a position of a device, in accordance with an example embodiment. The system 20 includes an input for receiving channel state data (such as channel state information) and an output for providing location data. By way of example, the system 20 may be provided at the base station 12 (or some other communication node). On receipt of channel state data relating to communications between a device (such as the user device 14) and the base station, the system 20 seeks to provide an estimate of the location of that device.

Machine Learning (ML) is a candidate technology for converting channel state information into device location estimates. However, many known ML algorithms rely on supervised learning and hence require a large amount of labelled data for training purposes. Not only is the availability of suitable training data limited, any such model would need to be repeatedly retrained due to the changing nature of the relationship between channel state information (CSI) and user device location, thereby requiring the generation of new training data.

Figure 3:
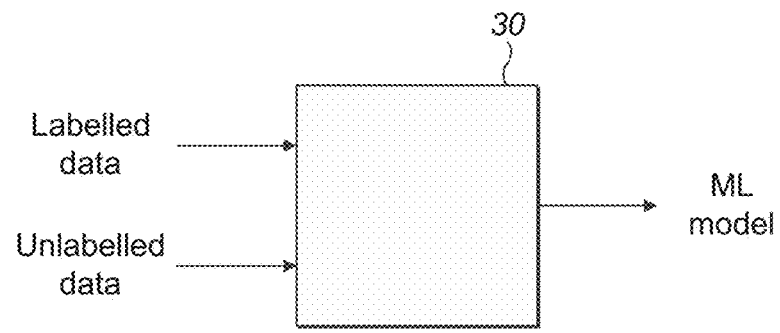

FIG. 3 is a block diagram of a system 30 in accordance with an example embodiment. The system 30 receives both labelled data and unlabelled data for use in training a Machine Learning (ML) model. The ML model may be implemented using neural networks, as discussed further below.

As described in detail below, the labelled data includes both channel state data (such as channel state information) and location data associated with the channel state data. The unlabelled data includes channel state data (such as channel state information), but does not include associated location data.

Figure 4:
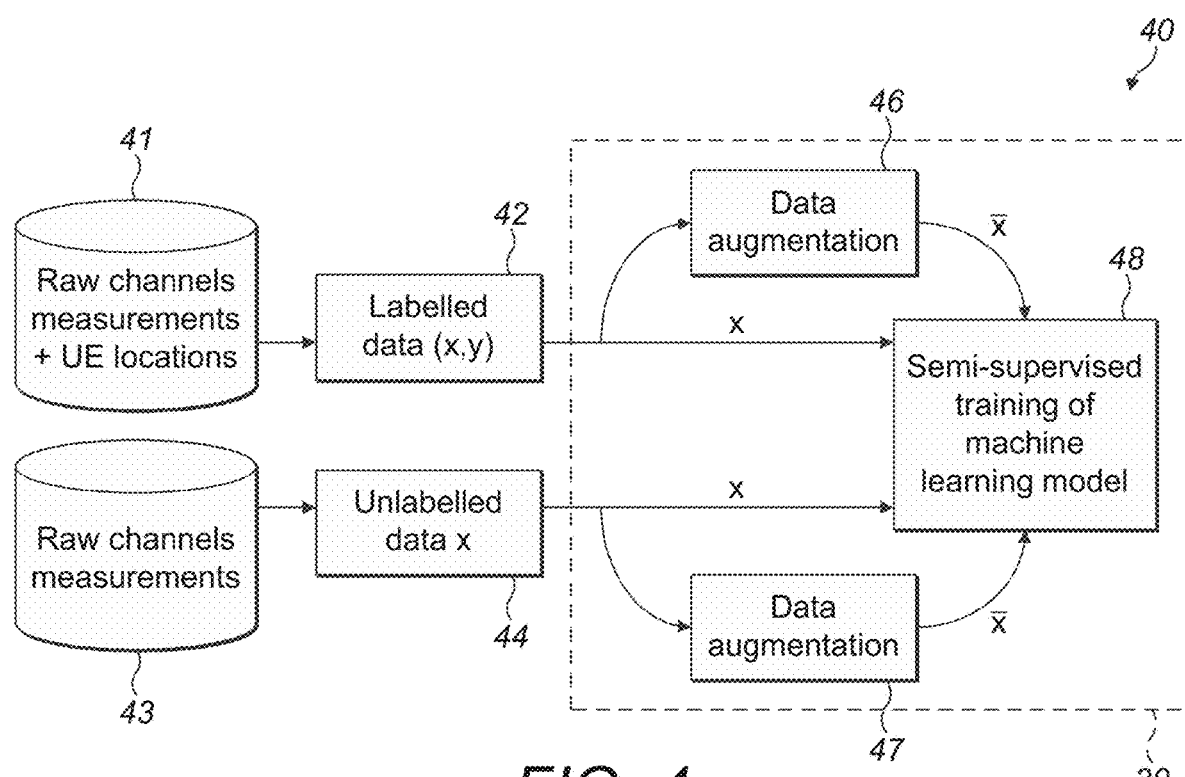

FIG. 4 is a block diagram of a system, indicated generally by the reference numeral 40, in accordance with an example embodiment. The system 40 provides a high-level view of an algorithm in accordance with an example embodiment.

The system 40 comprises a first module 41 that obtains raw channel measurements (e.g. channel state data) and associated user device location data. The data obtained by the first module 41 are organised into labelled data 42 comprising data pairs (x, y) including channel state data x and location data y.

The system 40 further comprises a second module 43 that obtains raw channel measurement (e.g. channel state data), without associated user device location data. The data obtained by the second module 43 are organised into unlabelled data 44 comprising channel state data x.

The labelled data 42 and the unlabelled data 44 are the inputs to the system 30 described above. As shown in FIG. 4, the system 40 comprises a first data augmentation module 46, a second data augmentation module 47 and a training module 48.

The first data augmentation module 46 generates first augmented data comprising augmented versions of the channel state data of the labelled data 42. Similarly, the second data augmentation module 47 generates second augmented data comprising augmented versions of the channel state data of the unlabelled data 44. The first and second data augmentation modules may implement the same function (indeed, in some embodiments, a single data augmentation module may be provided) and may be used to convert channel state data x into augmented data x.

The training module 48 generates a ML model (i.e. the output of the system 30) on the basis of the labelled data 42, the unlabelled data 44, the first augmented data and the second augmented data.

For the purpose of user device positioning, the raw channel measurements received by the system 40 may be channel state information (CSI) data as estimated at the relevant communication node (e.g. the base station 12 described above). These CSI data, which may be provided in the time domain or in the frequency domain, may, for example represent the channel between the transmitting antenna(s) at the user device and the receiving antenna array at the base station. For some of the CSI data, the actual position of the user device may be available; if so, labelled data 42 can be provided to the system 40. For the remaining (unlabelled) data 44, the user device location is not available. In many example embodiments, only a small fraction of the available training data is labelled data.

As described above, the system 40 generates augmented data both for the labelled data and the unlabelled data. Data augmentation refers to a transformation (e.g. a random or pseudo-random transformation) of the input data (e.g. CSI data), for example without altering the relationship of that data with the actual user device position. The use of data augmentation seeks to make the ML model more robust to generalization errors.

A few examples of data augmentation techniques are set out below. The skilled person will be aware of alternative data augmentation techniques that could be used.

Phase rotation: Some (e.g. all) elements of an original channel state (e.g. CSI) vector are rotated by the same phase. The phase may be chosen (e.g. randomly or pseudo-randomly) between $[-\pi, \pi]$ radians.

Amplitude magnification or reduction: The magnitudes of some (e.g. all) elements of an original channel state (e.g. CSI) vector are altered by the same amount. This amount may be chosen (e.g. randomly or pseudo-randomly) between $[-\alpha, \alpha]$, where $\alpha$ is a small positive number and represents the fraction of the average magnitude of all the elements of the original channel state vector.

Gaussian noise: A Gaussian noise vector is added to an original channel state (e.g. CSI) vector. The power of this noise vector may be a small fraction of the average power of the original channel state vector.

Filtering/smoothing: If the channel state data is in frequency domain, then the magnitude across subcarriers can be smoothed using a low-pass filter.

Neural network-based augmentation: This involves the usage of a separate neural network that is trained to find appropriate augmentations for the input channel state (e.g. CSI) vectors.

Element replacement: This involves replacing small (e.g. a small fraction) of the components of each channel state (e.g. CSI) vector by arbitrary values from a known range of values.

Figure 5:
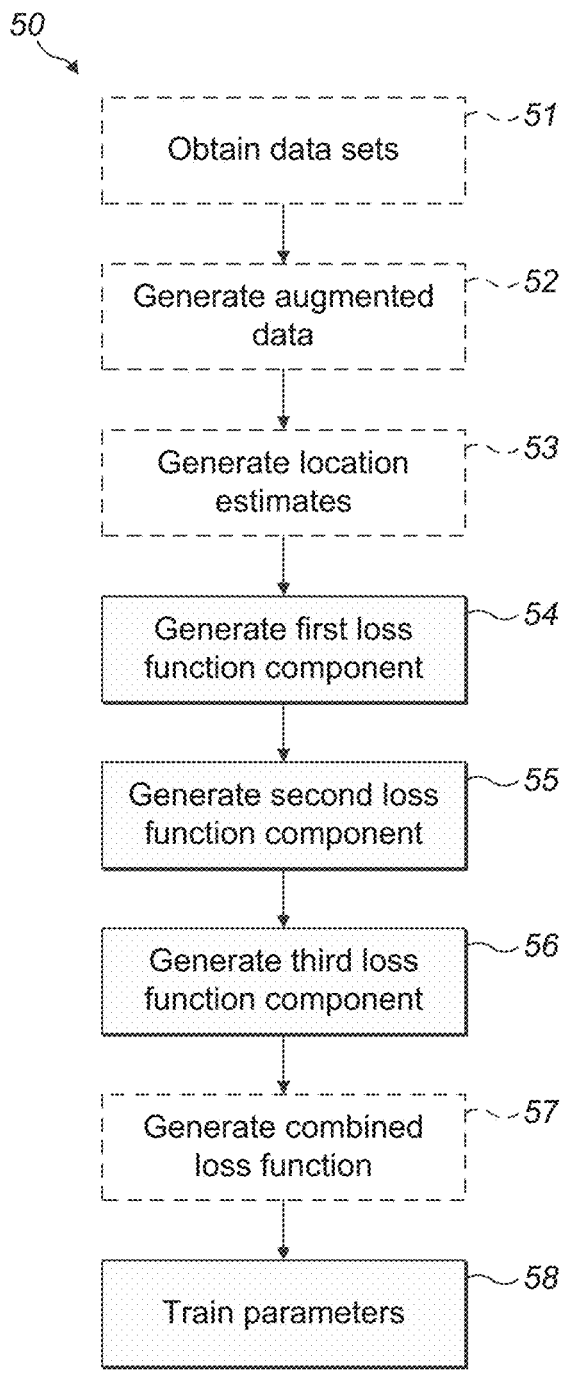
FIG. 5 is a flow chart showing an algorithm in accordance with an example embodiment.

FIG. 5 is a flow chart showing an algorithm, indicated generally by the reference numeral 50, in accordance with an example embodiment.

The algorithm 50 starts at operation 51, where data sets are obtained. The data sets may include a first data set comprising the labelled data 42 referred to above and a second data set comprises the unlabelled data 44 referred to above.

At operation 52, augmented data is generated. The augmented data may include data based on at least some of the channel state data of the first data set that has been subjected to said first augmentation and/or based on at least some of the channel state data of the second data set that has been subjected to said second augmentation.

At operation 53, location estimates are generated. Location estimates may be generated by a model (such as the model 30). The said model may be used to generate location estimates from channel state data and/or augmented channel state data, as discussed in detail below.

The data obtained or generated in the operations 51 to 53 may be used in the operations 54 to 58 discussed below. It should be noted, however, that the data may be received, retrieved or obtained in some other way, such that one or more of the operations 51 to 53 are optional in some example embodiments.

At operation 54, a first loss function component is generated. The first loss function component may be generated by comparing measurement location data with first location estimates based on channel state data, wherein the first location estimates are generated using a model (e.g. in the operation 53 discussed above). As discussed further below, the model may comprise a plurality of trainable parameters.

At operation 55, a second loss function component is generated. The second loss function component may be generated by comparing the measurement location data with second location estimates based on channel state data that has been subjected to a first augmentation, wherein the second location estimates are generated using the model (e.g. in the operation 53 discussed above).

At operation 56, a third loss function component is generated. The third loss function component may be generated by comparing third location estimates based on channel state data and fourth location estimates based on modified channel state data, wherein the modified channel state data is the channel state data having been subjected to a second augmentation. The third and fourth location estimates are generated using the model (e.g. in the operation 53 discussed above).

At optional operation 57, a combined loss function may be generated by combining the first, second and third loss function components. This step is optional since, in some example embodiments, no explicit combination operation is required (or this operation may be carried out elsewhere, such as at a server).

Finally, at operation 58, the trainable parameters of the model (e.g. the model 30) may be trained by minimising a loss function based on a combination of the first, second and third loss function components (e.g. by minimising the loss function generated in the operation 57). That combination may be a sum of the first, second and third loss function components (e.g. a weighted sum).

Of course, although the operations 54 to 56 are shown three separate operations in a specific order, the order of those operations could be changed; moreover one or more of those operations could be merged into a single operation or some or all of the operations may be carried out in parallel.

Figure 6:
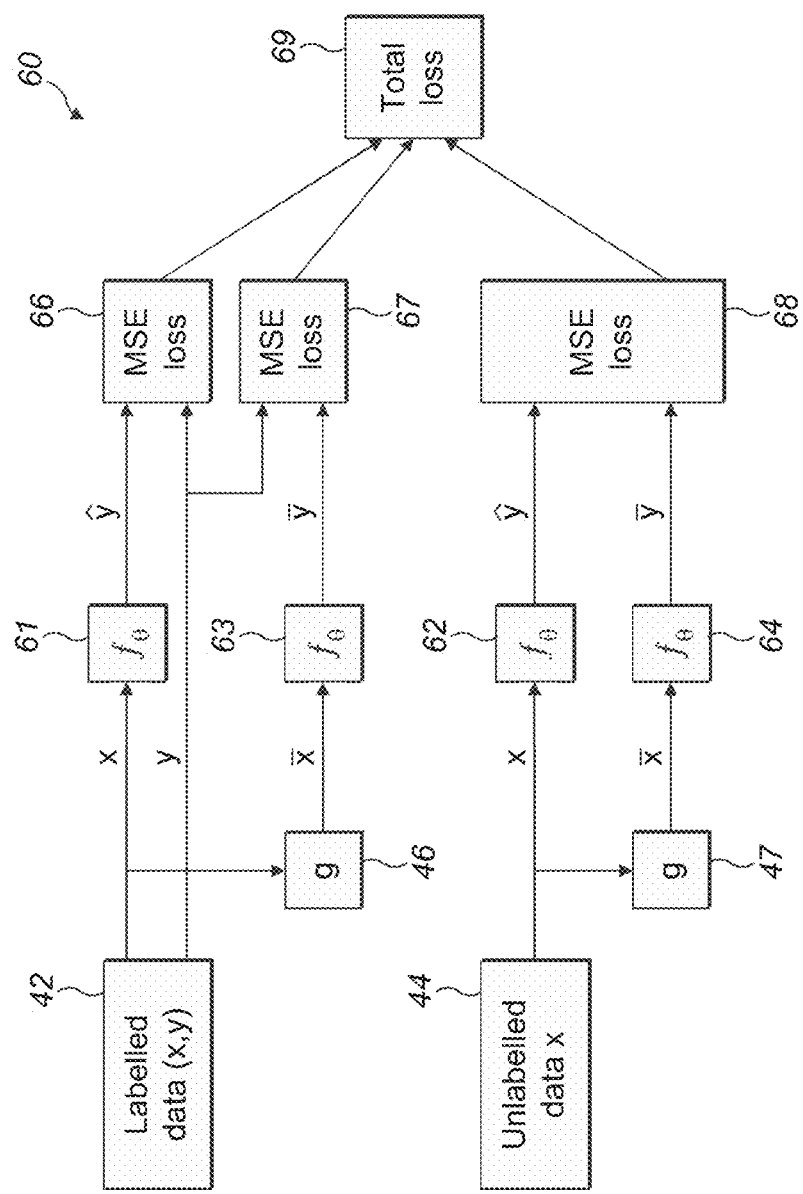
FIG. 6 is a block diagram of a system in accordance with an example embodiment.

FIG. 6 is a block diagram of a system, indicated generally by the reference numeral 60, in accordance with an example embodiment. The system 60 may be used to implement the algorithm 50 described above.

The system 60 includes the labelled data 42, the unlabelled data 44, the first data augmentation module 46 and the second data augmentation module 47 of the system 40 described above. The system 60 also includes a first function block 61, a second function block 62, a third function block 63, a fourth function block 64, a first MSE loss module 66, a second MSE loss module 67, a third MSE loss module 68 and a total loss module 69. The first to fourth function blocks 61 to 64 may be functionally identical and may, for example, implement the model 30 described above. Similarly, as noted above, the first data augmentation module 46 and the second data augmentation module 47 may be functionally identical.

As discussed above, the labelled data 42 comprises data pairs (x, y) including channel state data x and location data y and the unlabelled data 44 comprises channel state data x.

The first function block 61 receives channel state data x and generates a location estimate $\hat{y}$ based on the channel state data x. The second function block 62 also generates a location estimate $\hat{y}$ based on the channel state data x. The first and second function blocks may therefore differ only in the source of the channel state data (and may be implemented as a single function block).

The third function block 63 receives augmented channel state data x and generates a location estimate y based on the augmented channel state data x. The fourth function block 64 also generates a location estimate y based on the augmented channel state data x. The third and fourth function blocks may therefore differ only in the source of the augmented channel state data (and may be implemented by a single function block, indeed the first to fourth function blocks may be implemented by a single function block).

The first MSE loss module 66 generates a first loss function component, thereby implementing operation 54 of the algorithm 50 described above. The first MSE loss module 66 generates the first loss function component based on the location data y (obtained from the labelled data 42) and the location estimates $\hat{y}$ (generated by the first function block 61), wherein the location estimates $\hat{y}$ are generated using a model (such as the model 30 referred to above).

The second MSE loss module 67 generates a second loss function component, thereby implementing operation 55 of the algorithm 50 described above. The second MSE loss module 67 generates the second loss function component based on the location data y (obtained from the labelled data 42) and the location estimates $\bar{y}$ (generated by the third function block 63), wherein the location estimates $\bar{y}$ are generated using the model (such as the model 30).

The third MSE loss module 68 generates a third loss function component, thereby implementing operation 56 of the algorithm 50 described above. The third MSE loss module 68 generates the third loss function component based on the location estimates $\hat{y}$ (generated by the second function block 62) and the location estimates $\bar{y}$ (generated by the fourth function block 64).

The total loss module 69 generates a combined loss function based on the outputs of the first, second and third MSE loss modules 66 to 68, thereby implementing operation 57 of the algorithm 50 described above. The output of the total loss module 69 may therefore be used for training parameters of the model (e.g. the model 30), thereby implementing operation 58 of the algorithm 50.

Figure 7:
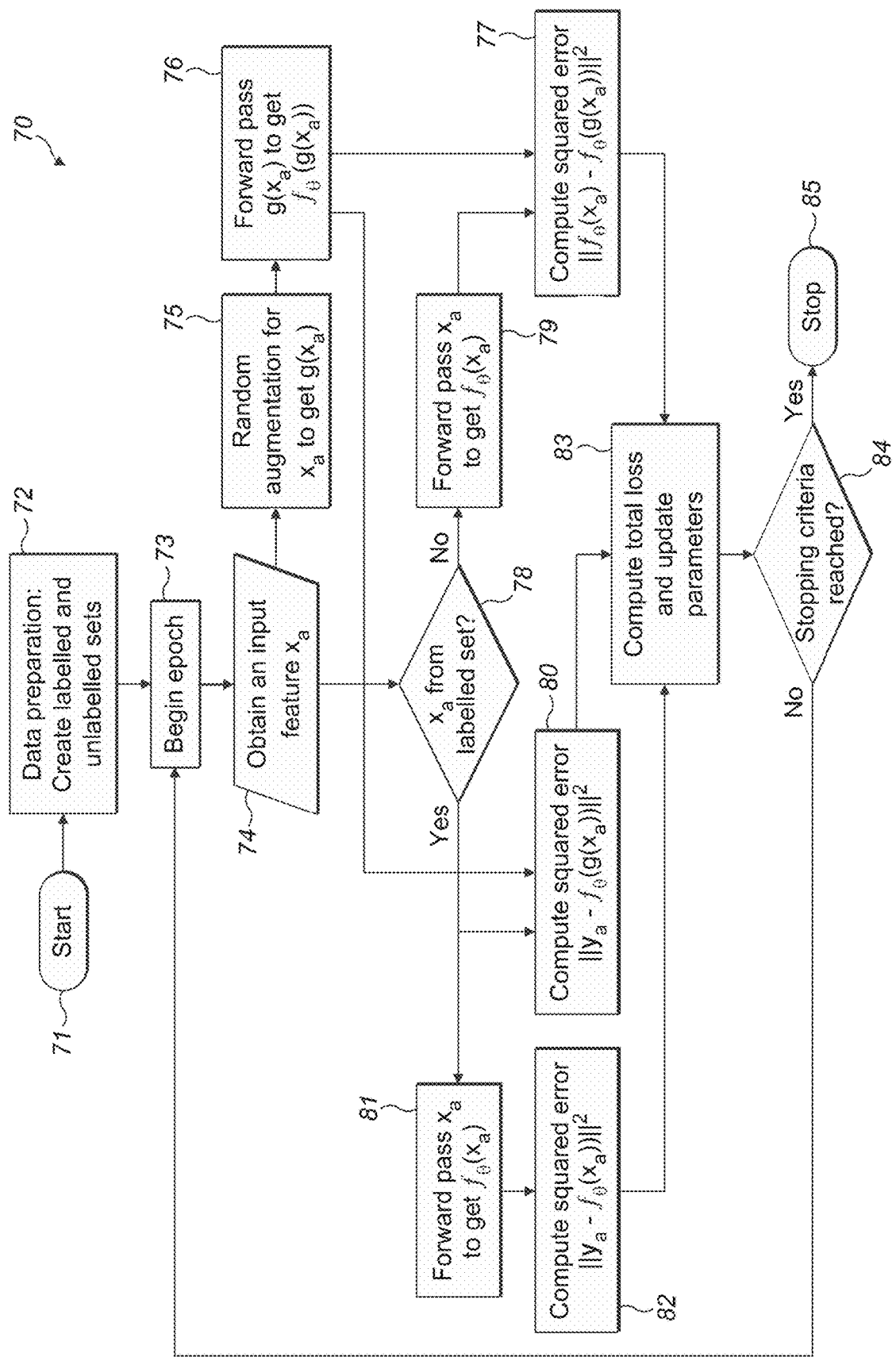
FIG. 7 is a flow chart showing an algorithm in accordance with an example embodiment.

FIG. 7 is a flow chart showing an algorithm, indicated generally by the reference numeral 70, in accordance with an example embodiment.

The algorithm 70 starts at operation 71 and the moves to operation 72.

Operation 72 is a data preparation step in which the labelled data 42 and unlabelled data 44 are generated. The operation 72 is therefore an example of the operation 51 of the algorithm 50.

Expressed mathematically, let $\mathcal{L}$ denote the set of labelled data 42. Thus, each element of $\mathcal{U}$ is a pair (x, y), where x denotes the channel state data (CSI) and y denotes its associated position (e.g. in Euclidean space with respect to some reference point as the origin). Further, let $\mathcal{U}$ denote the set of unlabelled data 44, which means that the actual position is not available for any $x \in \mathcal{U}$. Further, let $f_e$ denote the machine learning model (e.g. the modules 61 to 64 described above) with trainable parameters {θ}, and g denote the data augmentation function (e.g. the modules 46 and 47 described above). As noted above, the data augmentation function may generate a random transformation of the input without changing its relationship with the actual UE position.

At operation 73, a training epoch begins. The algorithm 70 then moves to operation 74.

At operation 74, an input feature $x_a$ is obtained. The input feature $x_a$ comprises channel state data that is part of either labelled data or unlabelled data. The input feature $x_a$ is passed to both operations 75 and 78 described further below.

At operation 75, an augmentation g is applied to $x_a$ to obtain $g(x_a)$. The augmentation may be applied the data augmentation module 46 or the data augmentation module 47 depending on whether the input feature is part of labelled data or unlabelled data. Of course, in an example implementation, the data augmentation modules 46 and 47 may be implemented by the same module, thus the system 60 may be functional, rather than providing a circuit schematic.

From operation 75, the augmented data $g(x_a)$ is provided to operation 76, where that augmented data is applied to the model to generate the output $f_\theta(g(x_a))$. That output is provided to both the operation 77 and the operation 80 described below.

At operation 78, it is determined whether the input $x_a$ (received at the operation 78 from the operation 74) is from a labelled data set. If so, the algorithm 70 moves to both operations 80 and 81 described further below. If not (indicating that the input $x_a$ is from unlabelled data), then the algorithm 70 moves to operation 79.

At operation 79, the data $x_a$ is applied to the model to generate the output $f_\theta(x_a)$. That output is provided to the operation 77.

At operation 77, the data $x_a$ has been determined to be unlabelled data. Two inputs are received at the operation 77: the function $f_\theta(g(x_a))$ (received from the operation 76, for example from the fourth function block 64 of the system 60 described above) and the function $f_\theta(x_a)$ (received from the operation 79, for example from the second function block 62 of the system 60 described above).

The operation 77 computes the square error $\|f_\theta(x_a) - f_\theta(g(x_a))\|^2$. The operation 77 is an example of the operation 56 of the algorithm 50 described above and may be implemented by the third MSE loss module 68 of the system 60 described above. The output of the operation 77 is provided to the operation 83 described further below.

The operation 80 (which follows from the operation 78 described above, in the event that the data $x_a$ is from a labelled set) generates an output based on the channel state data $x_a$ and its associated position $y_a$. The operation 80 computes the square error $\|y_a - f_\theta(g(x_a))\|^2$. The operation 80 is an example of the operation 55 of the algorithm 50 described above and may be implemented by the second MSE loss module 67 of the system 60 described above. The output of the operation 80 is provided to the operation 83.

At operation 81, the data $x_a$ is applied to the model to generate the output $f_\theta(x_a)$. That output is provided to the operation 82. The operation 82 computes the square error $\|y_a - f_\theta(x_a)\|^2$. The operation 82 is an example of the operation 54 of the algorithm 50 described above and may be implemented by the first MSE loss module 66 of the system 60 described above. The output of the operation 81 is provided to the operation 83.

Thus, the operation 83 receives inputs from the operations 77, 80 and 82 described above. The operation 83 computes a loss function from the squared error outputs of the operations 77, 80 and 82 and is therefore an example of the operation 57 of the algorithm 50 described above and may be implemented by the total loss module 69 of the system described above.

The loss function generated in the operation 83 may be given by:

$$L = \frac{1}{|\mathcal{L}|} \sum_{(x,y) \in \mathcal{L}} \|y - f_\theta(x)\|^2 + \frac{1}{|\mathcal{L}|} \sum_{(x,y) \in \mathcal{L}} \|y - f_\theta(g(x))\|^2 + \frac{1}{|\mathcal{U}|} \sum_{x \in \mathcal{U}} \|f_\theta(x) - f_\theta(g(x))\|^2.$$

The loss function generated in the operation 83 is used to update parameters θ of the model 30.

From operation 83, the algorithm moves to operation 84, where a determination is made regarding whether a stopping criterion has been reached (e.g. whether the training of the model 30 is complete). The stopping criteria can take many forms, such a number of iterations of the operations 73 to 83 have been completed, if the loss has reached or is below a certain value, if the loss has not decreased over a fixed number of iterations etc. The skilled person will be aware of further options for implementing the operation 84.

If the stopping criteria has been reached, the algorithm terminates at operation 85. Otherwise, the algorithm returns to operation 73, where a further epoch of the model training is implemented. (In some example embodiments, a number of samples are considered in an epoch, and the loss is averaged over those samples.)

In the algorithm 70, a first MSE term relates to labelled data. This term enables the model to learn hidden relationship between the input channel state data and the actual device position in a manner that imitates supervised learning with a large labelled data set.

A second MSE term is based on a predicted position based on augmented data and the associated device position. A third MSE is based on the predicted positions for the unlabelled data and its augmented counterpart. The use of augmented data seeks to make the model more robust to generalisation errors. It is to be noted that at each training epoch, the model sees augmented data that is different from those in earlier epochs because of the random nature of augmentation. Due to the nature of the proposed training process, one can expect the learned model to be more accurate for predictions on unseen data than would be the case with conventional ML techniques for the same amount of labelled training data.

In an alternative embodiment, instead of one augmentation per data sample per epoch (as described above with reference to FIG. 7), one can have multiple augmentations per data sample per epoch. For example, one can have k augmentations for each sample from the labelled set and l augmentations for each sample from the unlabelled data set in every epoch, where k,l are positive integers. The values of k and l can be determined experimentally.

Figure 8:
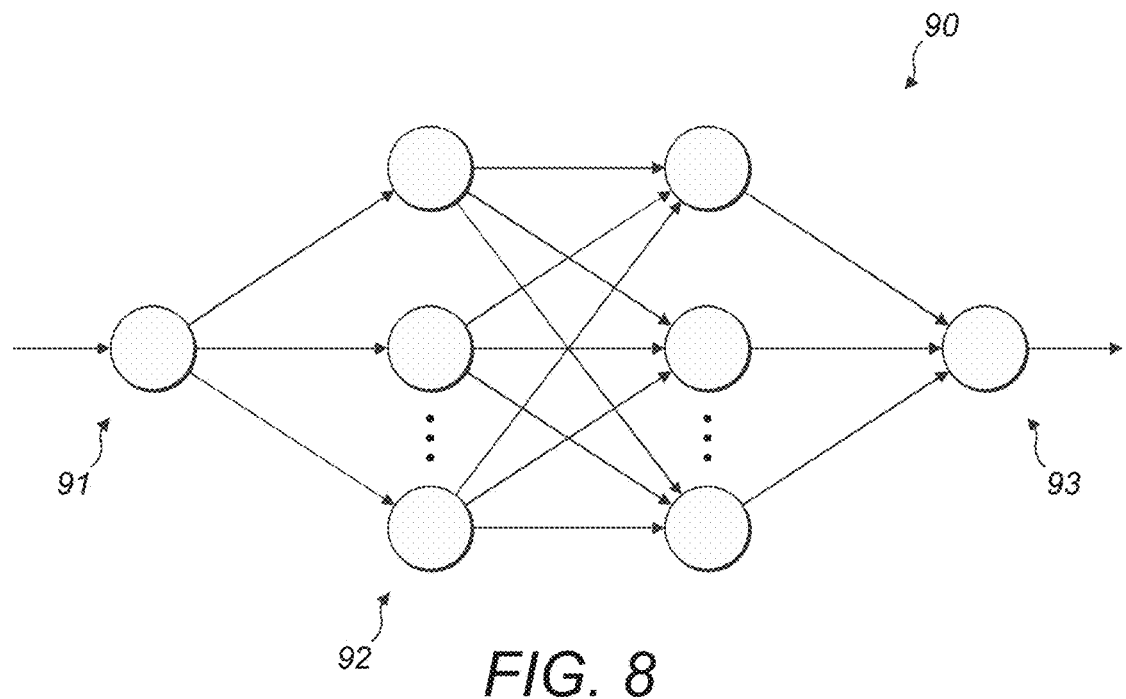
FIG. 8 is a block diagram of a neural network that may be used in some example embodiments.

FIG. 8 is a block diagram, of a neural network, indicated generally by the reference numeral 90, that may be used in some example embodiments. For example, the model 30 may be a machine learning model that may be implemented using a neural network, such as the neural network 90.

The neural network 90 comprises an input layer 91, one or more hidden layers 92, and an output layer 93. During the usage of the neural network 90, at the input layer 91, input such as channel state data may be received. The hidden layers 92 may comprise a plurality of hidden nodes, where the processing may be performed based on the received inputs (e.g. channel state data).

At the output layer 93, one or more outputs (e.g. location data) relating to the input may be provided.

The neural network 90 may be trained with inputs, including the labelled data 42 and unlabelled data 44 described above. The training may be performed at the base station 12 or elsewhere (such as at a server). The neural network 90 may be trained offline (e.g. pre-trained before starting the use of the model) and/or may be trained online (e.g. training may continue, and the neural network 90 may be updated based on new data).

Figure 9:
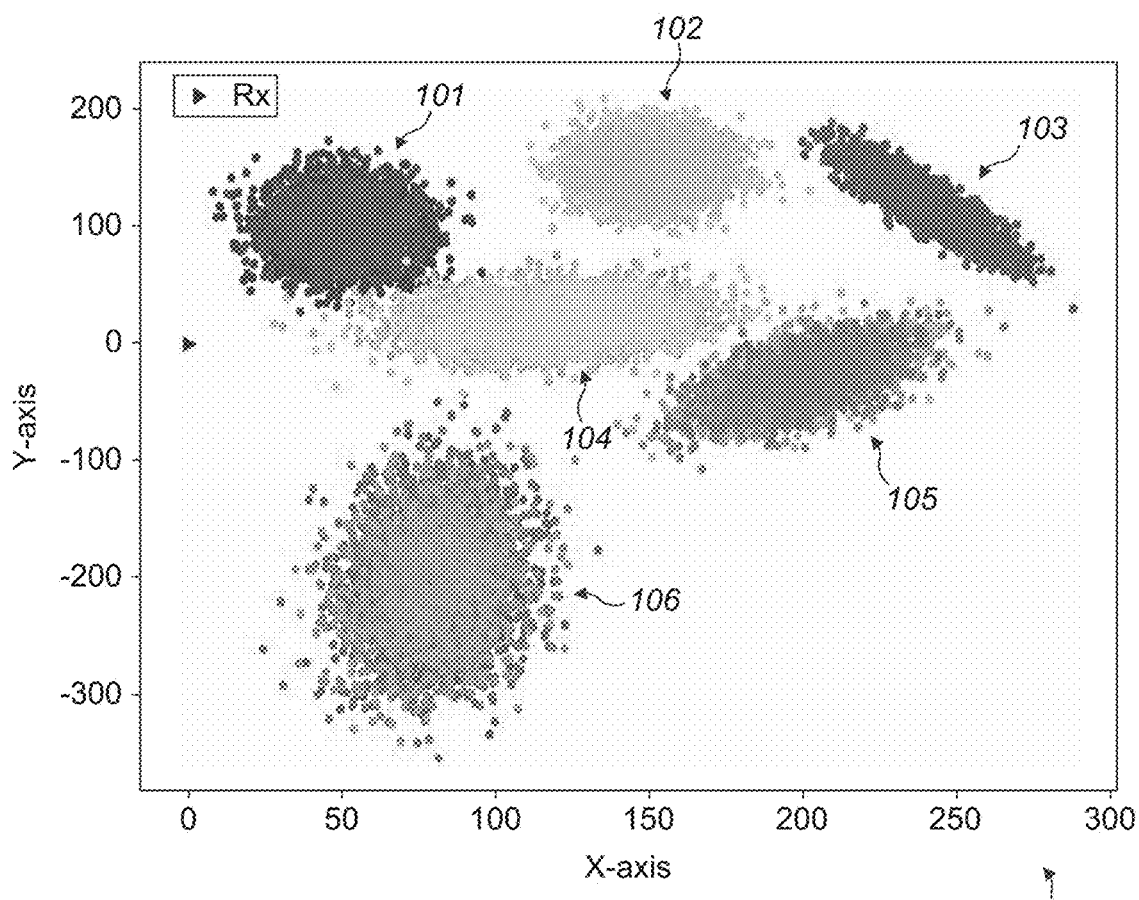
FIGS. 9 to 12 are plots in accordance with example embodiments.

FIG. 9 is a plot, indicated generally by the reference numeral 100, in accordance with an example embodiment. The plot 100 shows 24576 user devices (UEs) arranged in six clusters (indicated generally by the reference numerals 101 to 106 respectively). A base station in communication with the 24576 UEs is at the origin of the plot and is equipped with 16 receiving antennas. Each of the UEs has a single transmitting antenna. The simulation results discussed below consider a line-of-sight (LoS) model for the system.

The training data (with labels) consisted of 2213 samples (less than 10% of all samples). We used a deep neural network with two hidden layers. The first hidden layer has 256 neurons while the second layer has 32. The input is the 32-real dimensional CSI vector (since the CSI vector in this case in 16-complex dimensional due to the presence of 16 receive antennas at the base station). We used the 'relu' activation functions throughout except at the output layer which uses the 'linear' activation. We trained the model for 1000 epochs using the mean-squared-error loss function.

Figure 10:
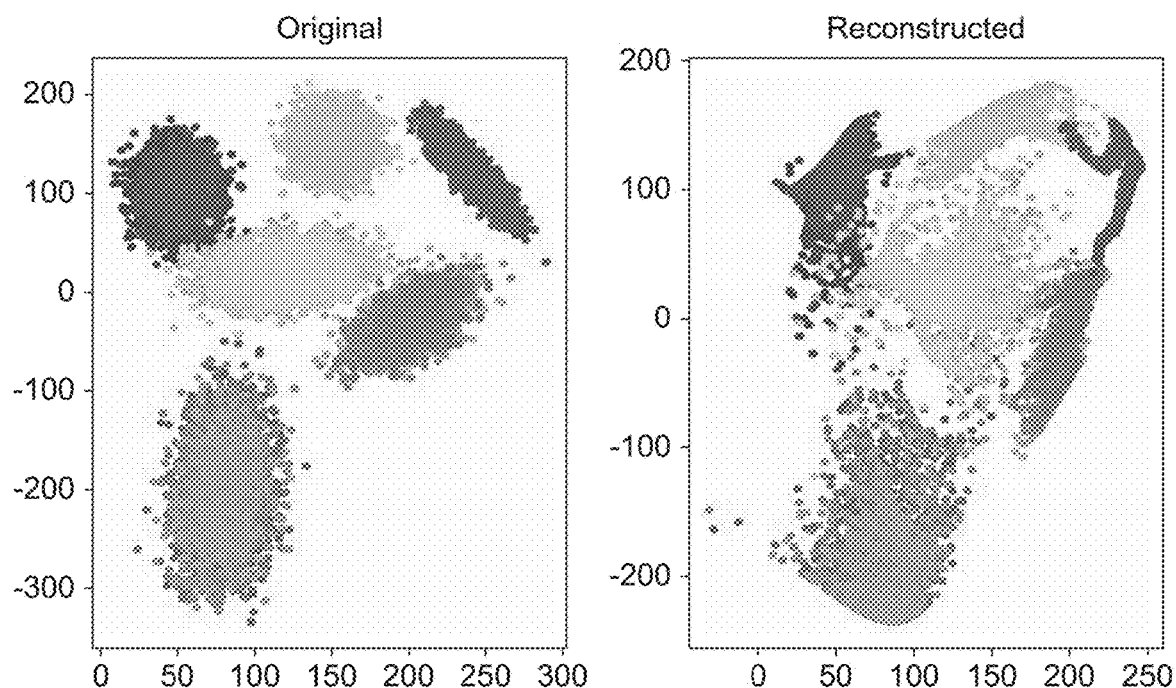

FIG. 10 is a plot, indicated generally by the reference numeral 110, in accordance with an example embodiment. The plot 110 shows the original clusters 101 to 106 (on the left) and shows reconstructed positions for all 24576 UEs (on the right). Since the training sample size was small, the reconstruction error (the average of the absolute Euclidean distance between the actual and the estimated positions) is large (14.26 m in this particular example).

Next, we trained the same model but using data augmentation as described above. We used random phase rotation for the purpose of data augmentation. In each epoch and for every minibatch (consisting of both labelled and unlabelled samples), an arbitrary phase was chosen and all the vector elements of all the samples in the batch were rotated by that phase angle. As before, we considered the size of the labelled data to be 2213 and the training is performed for 1000 epochs.

Figure 11:
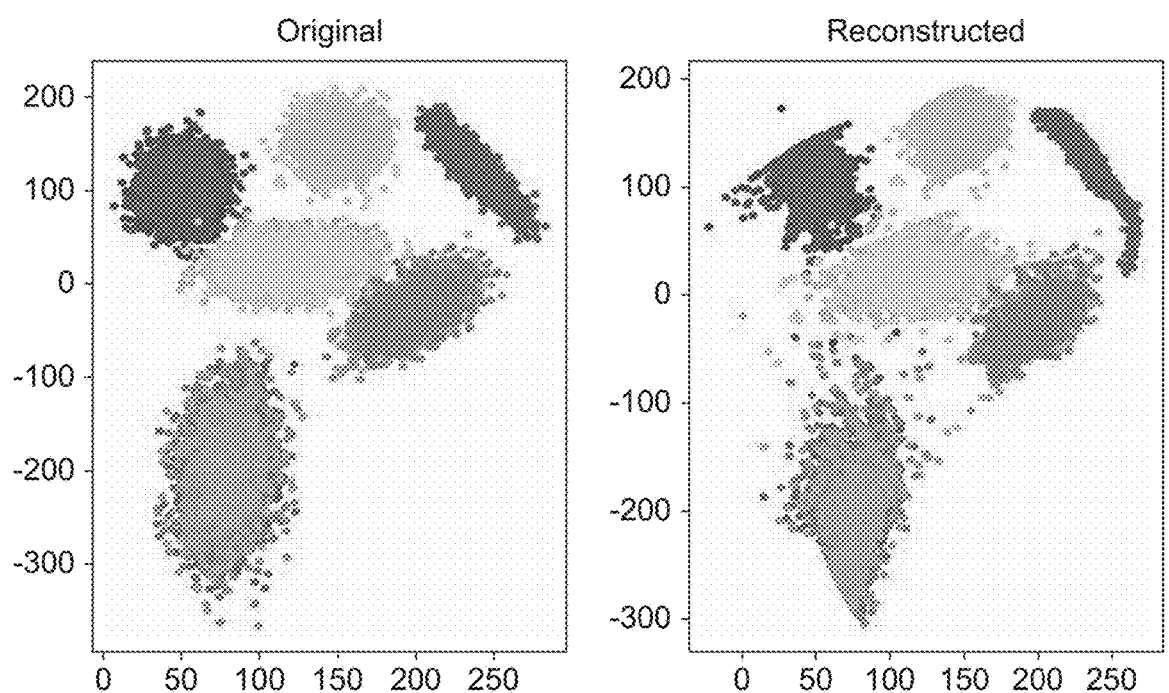

FIG. 11 is a plot, indicated generally by the reference numeral 120, in accordance with an example embodiment. The plot 120 shows the original clusters 101 to 106 (on the left) and shows reconstructed positions for all 24576 UEs (on the right). The reconstruction error achieved is 4.86 m (i.e. much better than in the plot 110).

Figure 12:
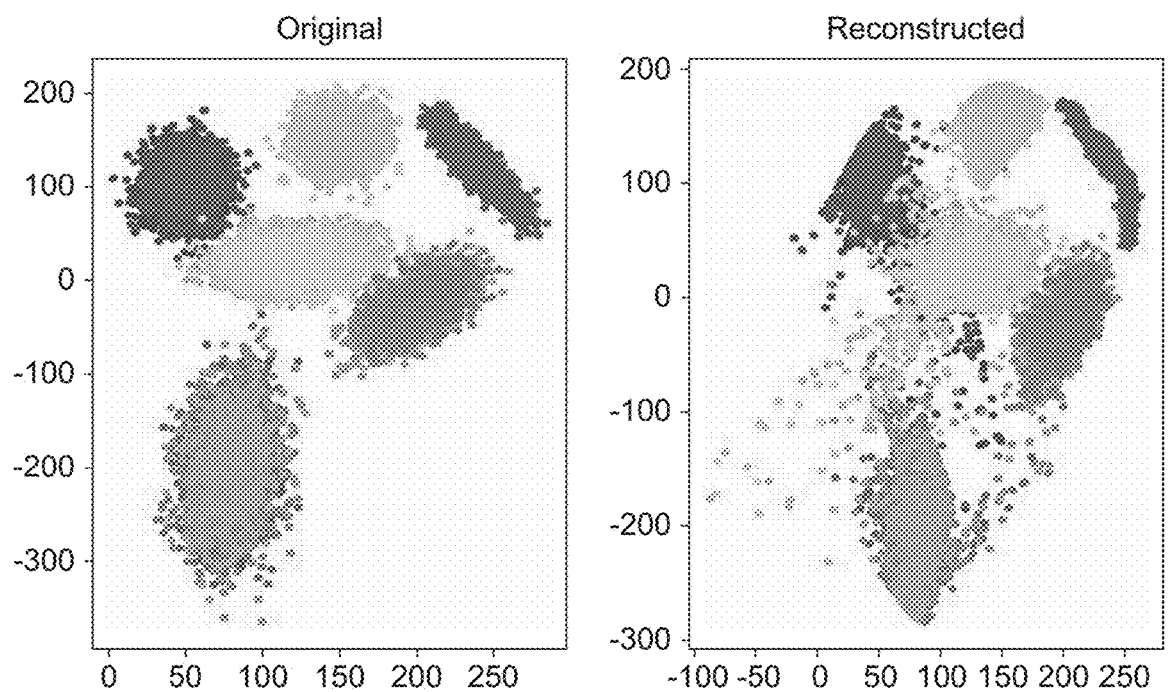

We next trained the model on only 222 labelled data samples. FIG. 12 is a plot, indicated generally by the reference numeral 130, in accordance with an example embodiment. Again, the plot 130 shows the original clusters (on the left) and the estimated positions for all the samples (on the right). The reconstruction error achieved is 6.67 m, despite the very small amount of labelled data.

In the example embodiments described above, augmented data is generated based on channel state information. In some example embodiments, multiple augmented data may be generated for at least some channel state information. This may, for example, increase the amount of augmented data available for training machine learning models.

Figure 13:
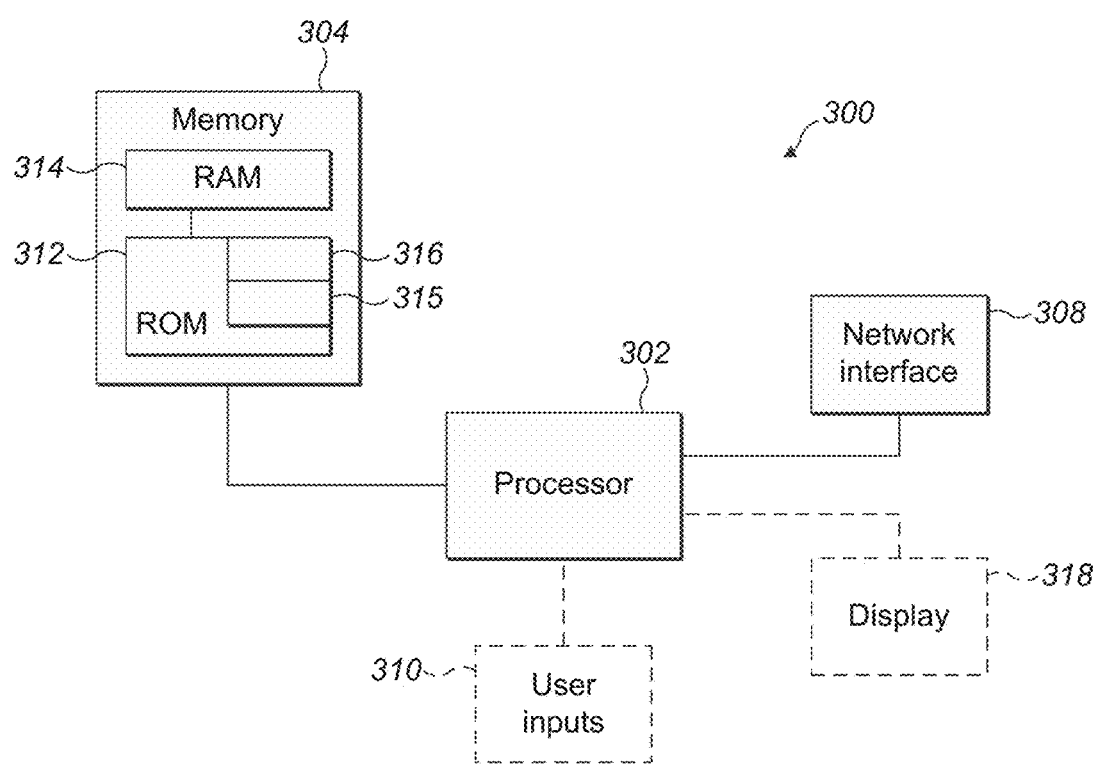
FIG. 13 is a block diagram of a components of a system in accordance with an example embodiment.

For completeness, FIG. 13 is a schematic diagram of components of one or more of the example embodiments described previously, which hereafter are referred to generically as a processing system 300. The processing system 300 may, for example, be the apparatus referred to in the claims below.

The processing system 300 may comprise one or more of: a processor 302, a memory 304 closely coupled to the processor and comprised of a RAM 314 and a ROM 312, a user input 310 (such as a touch screen input, hardware keys and/or a voice input mechanism) and a display 318 (at least some of those components may be omitted in some example embodiments). The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 50 and 70 described above. Note that in the case of small device/apparatus the memory can be most suitable for small size usage i.e. not always a hard disk drive (HDD) or a solid state drive (SSD) is used. The memory 304 may include computer program code, such that the at least one memory 304 and the computer program may be configured, with the at least one processor 302, may cause the performance of the apparatus.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 14A:
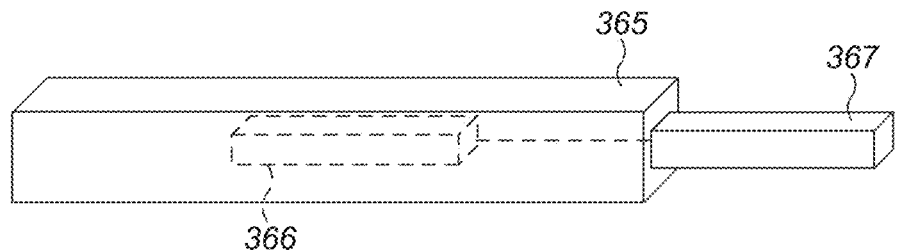
FIGS. 14A and 14B show tangible media, respectively a removable memory unit and a compact disc (CD) storing computer-readable code which when run by a computer perform operations according to embodiments.
Figure 14B:
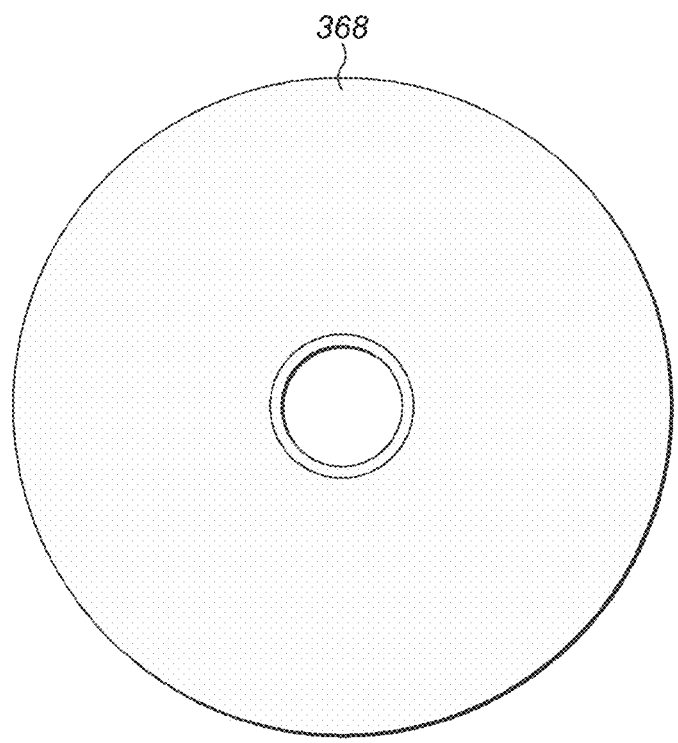

FIGS. 14A and 14B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 5 and 7 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and at least one memory including computer program code which, when executed by the at least one processor, causes the apparatus to:
   generate a first loss function component comprising comparing first location data with first location estimates, wherein the first location estimates are based on channel state data, wherein the first location estimates are generated using a model, and wherein the model comprises a plurality of trainable parameters;
   generate a second loss function component comprising comparing the first location data with second location estimates, wherein the second location estimates are based on channel state data that have been subjected to a first augmentation and wherein the second location estimates are generated using the model;
   generate a third loss function component comprising comparing third location estimates based on channel state data and fourth location estimates based on channel state data that have been subjected to a second augmentation, wherein the third and fourth location estimates are generated using the model, wherein each augmentation provides random or pseudo-random selection of at least one of phase rotation, amplitude magnification, or amplitude reduction of the relevant channel state information; and
   train the trainable parameters of the model by minimising a loss function based on a combination of the first, second and third loss function components.

2. An apparatus as claimed in claim 1 further configured to:
   generate the loss function by combining the first, second and third loss function components.

3. An apparatus as claimed in claim 1 wherein said combination comprises a sum of the first, second and third loss function components.

4. An apparatus as claimed in claim 3, wherein said sum is a weighted sum.

5. An apparatus as claimed in claim 1 further configured to:
   receive, retrieve or otherwise obtain a first data set, wherein the first data set comprises labelled data including channel state information and associated location data, wherein said first location data is derived from said associated location data.

6. An apparatus as claimed in claim 5 further configured to:
generate the first location estimates based on at least some of the channel state data of the first data set; and
generate the second location estimates based on at least some of the channel state data of the first data set that have been subjected to said first augmentation.

7. An apparatus as claimed in claim 1 further configured to:
receive, retrieve or otherwise obtain a second data set, wherein the second data set comprises unlabelled data including channel state information.

8. An apparatus as claimed in claim 7 further configured to:
generate the third location estimates based on at least some of the channel state data of the second data set; and
generate the fourth location estimates based on at least some of the channel state data of the second data set that have been subjected to said second augmentation.

9. An apparatus as claimed in claim 1, wherein each augmentation further comprises one or more of: an addition of Gaussian noise; a filtering or smoothing; a neural-network based augmentation; or an element replacement algorithm.

10. An apparatus as claimed in claim 1 further configured to:
generate a plurality of said second loss function components by comparing the first location data with multiple second location estimates based on channel state data subjected to different instances of the first augmentation; and/or
generate a plurality of said third loss function components by comparing the third location estimates with multiple fourth location estimates based on channel state data that have been subjected to different instances of the second augmentation.

11. An apparatus as claimed in claim 1, wherein the model is a machine-learning model.

12. An apparatus as claimed in claim 1, wherein the model is implemented using a neural network.

13. An apparatus as claimed in claim 1, wherein the model is configured to estimate a position of a user device based on channel state information for communications between the user device and a communication node.

14. A method comprising:
generating a first loss function component comprising comparing first location data with first location estimates, wherein the first location estimates are based on channel state data, wherein the first location estimates are generated using a model, and wherein the model comprises a plurality of trainable parameters;
generating a second loss function component comprising comparing the first location data with second location estimates, wherein the second location estimates are based on channel state data that have been subjected to a first augmentation and wherein the second location estimates are generated using the model;
generating a third loss function component comprising comparing third location estimates based on channel state data and fourth location estimates based on channel state data that have been subjected to a second augmentation, wherein the third and fourth location estimates are generated using the model, wherein each augmentation provides random or pseudo-random selection of at least one of phase rotation, amplitude magnification, or amplitude reduction of the relevant channel state information; and
training the trainable parameters of the model by minimising a loss function based on a combination of the first, second and third loss function components.

15. A method as claimed in claim 14 further comprising:
generating the loss function by combining the first, second and third loss function components.

16. A method as claimed in claim 14, wherein said combination comprises a sum of the first, second and third loss function components.

17. A method as claimed in claim 14, wherein said sum is a weighted sum.

18. A method as claimed in claim 14 further comprising:
receiving, retrieving or otherwise obtaining a first data set, wherein the first data set comprises labelled data including channel state information and associated location data, wherein said first location data is derived from said associated location data.

19. A non-transitory computer-readable medium comprising instructions for causing an apparatus to perform at least:
generate a first loss function component comprising comparing first location data with first location estimates, wherein the first location estimates are based on channel state data, wherein the first location estimates are generated using a model, and wherein the model comprises a plurality of trainable parameters;
generate a second loss function component comprising comparing the first location data with second location estimates, wherein the second location estimates are based on channel state data that have been subjected to a first augmentation and wherein the second location estimates are generated using the model;
generate a third loss function component comprising comparing third location estimates based on channel state data and fourth location estimates based on channel state data that have been subjected to a second augmentation, wherein the third and fourth location estimates are generated using the model, wherein each augmentation provides random or pseudo-random selection of at least one of phase rotation, amplitude magnification, or amplitude reduction of the relevant channel state information; and
train the trainable parameters of the model by minimising a loss function based on a combination of the first, second and third loss function components.

* * * * *